United States Patent
Maniaci (10) Patent No.: US 12,391,492 B2
(45) Date of Patent: Aug. 19, 2025

(54) DEVICE AND PROCESS FOR THE ORIENTATION OF CONTAINERS

(71) Applicant: ANTARES VISION S.P.A., Travagliato (IT)

(72) Inventor: Gianmarco Maniaci, Travagliato (IT)

(73) Assignee: ANTARES VISION S.P.A., Travagliato (IT)

( * ) Notice: Subject to any disclaimer, the term of this patent is extended or adjusted under 35 U.S.C. 154(b) by 515 days.

(21) Appl. No.: 17/765,925

(22) PCT Filed: Sep. 24, 2020

(86) PCT No.: PCT/EP2020/076677
§ 371 (c)(1),
(2) Date: Apr. 1, 2022

(87) PCT Pub. No.: WO2021/063788
PCT Pub. Date: Apr. 8, 2021

(65) Prior Publication Data
US 2022/0297949 A1 Sep. 22, 2022

(30) Foreign Application Priority Data
Oct. 1, 2019 (IT) .......................... 102019000017672

(51) Int. Cl.
*B65G 43/08* (2006.01)
*B65C 9/06* (2006.01)
(Continued)

(52) U.S. Cl.
CPC ............ *B65G 47/244* (2013.01); *B65C 9/067* (2013.01); *B65G 29/00* (2013.01); *B65G 43/08* (2013.01)

(58) Field of Classification Search
None
See application file for complete search history.

(56) References Cited

U.S. PATENT DOCUMENTS

| 9,533,787 B2 * | 1/2017 | Kwirandt ................ B65C 9/067 |
| 2007/0095017 A1 | 5/2007 | Menke |

(Continued)

FOREIGN PATENT DOCUMENTS

WO 2016155848 A1 10/2016

OTHER PUBLICATIONS

Guo, Xiaoting, et al. "Determine turntable coordinate system considering its non-orthogonality." Review of Scientific Instruments 90.3 (2019). (Year: 2019)*

(Continued)

*Primary Examiner* — Matthew C Bella
*Assistant Examiner* — Johnny B Duong
(74) *Attorney, Agent, or Firm* — TROUTMAN PEPPER LOCKE LLP (57) ABSTRACT

A device and a process for the orientation of containers with a carousel rotating about a vertical axis with a circumferential plurality of rotating seats imparting a rotation to each container causing a rotation-revolution. A recording device with illuminator recording multiple sequential images of the container during rotation-revolution. A controller adapted learn the lateral surface of said container in a number of positions. Learning each of the N positions said container is positioned with a random initial orientation, and during rotation a number of images are recorded. The controller acquires one current image, processes a similarity function representing the similarity between each current image and the images recorded in the same position in said learning step, calculates the similarity functions and the angle corresponding to the maximum value of this sum is used for the orientation of said container.

9 Claims, 7 Drawing Sheets

(51) Int. Cl.
    *B65G 29/00*     (2006.01)
    *B65G 47/244*     (2006.01)

(56) References Cited

U.S. PATENT DOCUMENTS

2010/0290695 A1     11/2010     Kwirandt
2016/0153950 A1     6/2016     Crisp

OTHER PUBLICATIONS

International Search Report and Written Opinion issued in corresponding International Patent Application No. PCT/EP2020/076677 dated Dec. 11, 2020.

* cited by examiner

DEVICE AND PROCESS FOR THE ORIENTATION OF CONTAINERS

CROSS REFERENCE TO RELATED APPLICATIONS

This is a U.S. National Phase Application under 35 U.S.C. § 371 of International Patent Application No. PCT/EP2020/076677, filed Sep. 24, 2020, which claims priority to Italian Patent Application No. 102019000017672, filed Oct. 1, 2019. The entire contents of which are hereby incorporated by reference.

FIELD OF THE INVENTION

The present invention relates to a device and a process for the orientation of containers.

BACKGROUND

As is known, in the market there presently exist various types of automatic orientation devices for the filling and/or labelling of semi-transparent or opaque plastic or glass containers on production lines consisting of both linear conveyors and rotating carousels.

Container orientation and quality control systems have been developed which are based on a rotating carousel having a circumferential plurality of plates rotating about their axis, wherein each plate supports a corresponding container and rotates upon itself so as to impart to the container a movement of rotation-revolution.

There exist simple devices of a mechanical type for the orientation of containers, wherein a tooth engages inside a special seat specially created on the bottom of the container in order to draw it in movement.

Furthermore, such mechanical systems equipped with a tooth require, accordingly, that the container have a special seat fashioned on the bottom for the engagement thereof. This type of device is imprecise and can only work at low speeds.

Devices for the orientation of containers based on optical systems that use sensors for this purpose are also known.

In this case, every container has a sensor in front of it which measures the profile thereof at its operating height.

These systems make their adaptation to a change in the container's shape very complicated and, moreover, are based on a very noisy signal from which it is consequently difficult to extract useful information relating to the container profile or shape.

Therefore, these systems, too, are complicated to set and in this case as well their adaptation to a change in the container shape is complicated and cumbersome, since all of the sensors must be placed at precisely the same height and operating distance of the containers.

In order to overcome these drawbacks, use is also made of optical systems based on the use of a few sensors mounted on a tilting mechanical assembly that follows one group of containers each time.

This system has the same disadvantages as the previous one, even though it implies a lower cost for the sensors, the latter being fewer in number, but this is offset by the higher cost of the mechanics since, as seen, a tilting mechanical assembly is required.

Consequently, it is possible to affirm that systems with optical sensors normally have the disadvantage of observing a single profile and, moreover, there are difficulties in setting them when the container shape is changed.

In the place of systems with optical sensors, optical vision systems are used; despite being more costly, they work on the basis of images and thus do not reconstruct only the profile of the container, but also the entire lateral surface that is observed of the latter.

In some cases, with the aim of containing costs, use has been made of low-cost vision systems capable of detecting a specific notch or a reference on the container and which work, therefore, like sensors, and as such can be positioned individually, one for each container housing seat, or mounted in a tilting assembly.

These sensors follow the container positioned, during rotation, in front of them and define a digital signal upon recognition of the notch or reference looked for.

The advantage offered by this technical solution compared to the others mentioned above is that it enables the entire surface shape of the container to be detected, not only a profile, and it makes detection extremely simplified in the case of a change in the format of the container itself. However, as noted, such systems have the disadvantage of having a high cost, given the number of vision systems necessary for their operation.

Vision systems in a fixed position set outside the detection device are very costly, and are consequently used only in top-of-the-range machines.

These machines generally have 3, 4, 5 or 6 recording points and, for every container set into rotation-revolution in front of them, each viewing point records an image that corresponds to an angular sector of the lateral surface of the container.

The successive images recorded from all of the viewing points reconstruct the entire lateral surface of the container.

The advantages that such systems have are related to their precision and high operating flexibility.

However, such systems are extremely costly when compared to the previous solutions. Furthermore, in order to achieve a correct joining of images so as to correctly reconstruct the lateral surface of the containers, the aforesaid systems need to know:
  the geometric position of the recording cameras in space
  the sequence of the angular positions in which the containers will be located in the photographing position
  some data regarding the geometry of the container.

The creation of a "container orientation" recipe for these systems is an operation that thus necessarily involves expert, qualified personnel.

SUMMARY

The task of the present invention is to devise a device and a process for the orientation of containers that resolve the above-mentioned drawbacks of the prior art.

Within the scope of this task, it is an object of the invention to devise a device and a process for the orientation of containers that is low cost, both from a structural and operational viewpoint. Another object of the invention is to provide a device and process for the orientation of containers which enables the latter to be oriented by observation of the lateral surface thereof and not a simple profile, with low costs and a single viewing point.

Another object of the invention is to provide a device and a process for the orientation of containers that offers all of the advantages of vision systems together with all of the advantages of optical systems in terms of operating costs and construction.

Another object of the invention is to provide a device and process for the orientation of containers that enables detection of the entire lateral surface of the container with a resolution aimed at the orientation thereof and with a desired precision, without having to employ specialized personnel for this purpose.

Another object of the invention is to provide a device and a process for the orientation of containers which, despite using a single viewing point, allows the container to be kept in focus during transit in the framed field of the latter, together with the fact of not being sensitive to the positioning of the recording device and of the associated illuminator.

Another object of the invention is to use a lighting strategy that maximizes the light reflected from the container relative to that transmitted inside the latter, so that the orientation process is scarcely sensitive to the container contents, even in the case of transparent containers.

Another object of the invention is to provide a system that does not require the intervention of particularly qualified personnel to put it into service, does not require the entry of any parameter regarding the geometry of the container, its rotation in the observation zone, or the geometry of the observation points.

Another object of the invention is to provide a system of compact size that can be installed inside machine guarding.

Another object of the invention is to minimize the angular part of the carousel required by the orientation system in order to perform its task, compared to the systems on the market, this being a variable that has an indirect impact on the cost of implementing the orientation of containers on the carousel, as it has an impact on the necessary machine space, and that space has a cost.

Yet another object of the invention is the possibility of providing non-qualified personnel, by means of a simple glance at a monitor, an emotional indication of the proper functioning of the orientation system itself and of real-time performance, even when the machine speed and the frequency of the containers to be oriented, which usually reach 20 pieces per second, would not allow any possibility of appreciating and understanding a numerical result.

This task and these and other objects are achieved by a device and a process for the orientation of containers according to the independent claims set forth below.

In a first preferred but non-exclusive embodiment, the device for the orientation of containers comprises a rotating carousel rotating about a vertical axis thereof having a circumferential plurality of seats, each of which rotates about its own axis to impart to each container housed therein a rotation about its own vertical axis and jointly with said rotating carousel a movement of rotation-revolution, a fixed illuminator of said container and a single fixed recording device for recording multiple sequential images of said container during said movement of rotation-revolution, said recording device being in a position to acquire the light reflected from said container illuminated by said illuminator, characterized in that it comprises an electronic control means having a learning means, a validation means and an operating means operating together in a temporal sequence, said learning means being adapted to carry out a step of learning the entire lateral surface of one said container in a number N of positions within the field framed by said recording device, in which, when said carousel is stationary, for each learning in each of the N positions said container is positioned with a random initial orientation, and during a rotation of 360° about its own axis a number R of images of said container being recorded, said validation means being adapted to carry out a validation step in which said electronic control means acquires from said recording device only one current image of said container in each position N, said electronic control means processing a similarity function representing the similarity between each current image Ni and the R images recorded in the same position N in said learning step, phase synchronizing and summing said similarity functions; an operating means active during the rotation of said rotating carousel, in which for each of said containers said electronic control means acquires from said recording device only one current image in each position N, processes a similarity function representing the similarity between each current image Ni and the R images recorded in the same position N in said learning step, calculates and sums the similarity functions and the angle am corresponding to the maximum value of this sum is used for the orientation of said container.

The process for the orientation of containers envisages imparting a motion of rotation-revolution to said containers on a rotating carousel, making the containers pass, while in movement, in front of an illuminator, recording for each container, from a single viewing point, a pre-established number R of images from N pre-established positions within the field framed by the recording device, characterized by the processing, by the electronic control system, of a similarity function representing the similarity between each current image and the R images recorded in the same position in an initial learning step with the carousel stationary, subsequently validated and phase synchronized, wherein the similarity functions are summed and the angle corresponding to the maximum value of the sum is used to identify the orientation of the container.

The dependent claims better clarify further features of the device according to the invention.

In particular, the illuminator is positioned relative to the container with an angle of incidence such as to maximize the amount of light reflected in a mirror-like manner relative to that transmitted inside the container so as to enable observation by reflection of the light of an angular sector of the surface of the container.

The width, in degrees, of the observed angular sector on which light is reflected towards the recording device is directly proportional to the length of the illuminator and the diameter of the container.

The invention relates to the devising of an orientation system based on a single recording device which, from a single observation point, photographs the container in succession during the transit thereof within the field framed by the recording device.

The invention relates to the use for this application of cameras with CMOS sensors which have the characteristic of enabling a mechanism of recording sequential images with "successive crops" of the sensor.

In this manner, the framed field being envisaged so as to photograph the container in N successive positions, the sensor crop is set in such a way as to have the sensor pick up only the portion of pixels where the container is located at each time during its advancement.

This mechanism is called a "sequencer", and makes it possible to reach very high photo taking frequencies.

The invention also relates to an orientation process characterized by a first step of "learning" the entire lateral surface of the container itself through a plurality of views.

The views are all those positions of the container, within the field framed by the camera, in which during the subsequent operating phase the container will be photographed in order to determine its orientation.

The invention further relates to the fact that the step of learning the container in each of the positions consists in the positioning, with the machine stationary, of the container in each of the positions themselves, the subsequent activation of a controlled rotation of the container on its axis and the automatic recording and saving, during the rotation, of a number R of images sufficient to allow angular discrimination at a desired resolution.

If, for example, the desired orientation resolution were 0.5 degrees, 720 images of the container in rotation would be saved by an automatic process, one image every half degree.

The aforesaid learning step, completely automatic, is repeated in all of the N positions within the field framed by the camera in which photos will be taken during the passage of the containers to be oriented.

Therefore, N×R images are recorded and saved during the learning step, where typical values are N=12 positions and R=360 images.

An innovative idea of the present invention is that of allowing this process to take place without any knowledge of the camera-illuminator-container geometry, and without the need to describe the aforesaid geometry to the orientation system with parameters.

The content of the present invention also relates to the possibility of starting each of the steps of learning the container during rotation in each of the N positions of the R photos from a random angle.

A fundamental basis of the present invention, moreover, is the lack of any need to describe, during the initial step of learning the container, or subsequently during the operating phase, the movement of rotation-revolution that the container completes in order to be observed and oriented by the recording device.

Another fundamental part of the present invention is a strategy which enables the orientation system to reconstruct the geometry of the container, the relative container-recording device-illuminator geometry, the position of the different points of recording of images of the container, the initial angle of learning the container in each recording point and the movement of rotation-revolution that the container completes within the field framed by the recording device during the operating phase, without the need, therefore, for said information to be collected and entered by qualified personnel.

A fundamental aspect of the invention relates to an automatic process that derives all of the above-mentioned information automatically on the basis of a statistical observation of a certain number of containers in transit in the field framed by the recording device.

This step is called validation, and consists in the simple passage and observation of the number of containers that is statistically necessary.

It is also a fundamental part of the present invention, and consists in the basis of algorithms which allow the above to be obtained, a measure of the similarity among images.

This measure is applied so as to measure the similarity between an image taken in a given position N during the passage of the container and all of the R images making up the population learned during the learning in that same given position N.

In other words, the objective of the process is the drawing of a graph that contains the measure of the similarity of an image (recorded in a given position during the passage of the container in the operating phase) to all the R images which, in the same position, have been recorded and saved in the learning step with the machine stationary and the container rotating on its axis.

This graph contains an indication that is easily understandable even to the eyes of less expert personnel, that is, the concept of "peak".

Such a peak is meant to be a visual expression enabling an understanding of which image of the learned population is most similar to the current one, if there are other similar images in the population, and in what proportion with respect to the main one, and its "sharpening" determines the precision of the system, i.e. the similarity difference between the most similar image among the ones learned and the images in the adjacent degrees.

In each of the N photo positions, in the initial learning step, a population of images R has thus been learned over the entire revolution of the container on its axis.

In the operating phase, an image is taken in each of the N positions and each of these images is compared with the entire population R learned in that position in order to construct a similarity graph as described above.

The results of this process are N similarity graphs, each of which may or may not show a peak.

BRIEF DESCRIPTION OF THE DRAWINGS

Additional features and advantages of the invention will become more apparent from the description of a preferred but non-exclusive embodiment of a device for the orientation of containers illustrated by way of non-limiting example in the appended drawings, in which.

DETAILED DESCRIPTION

Figure 1:
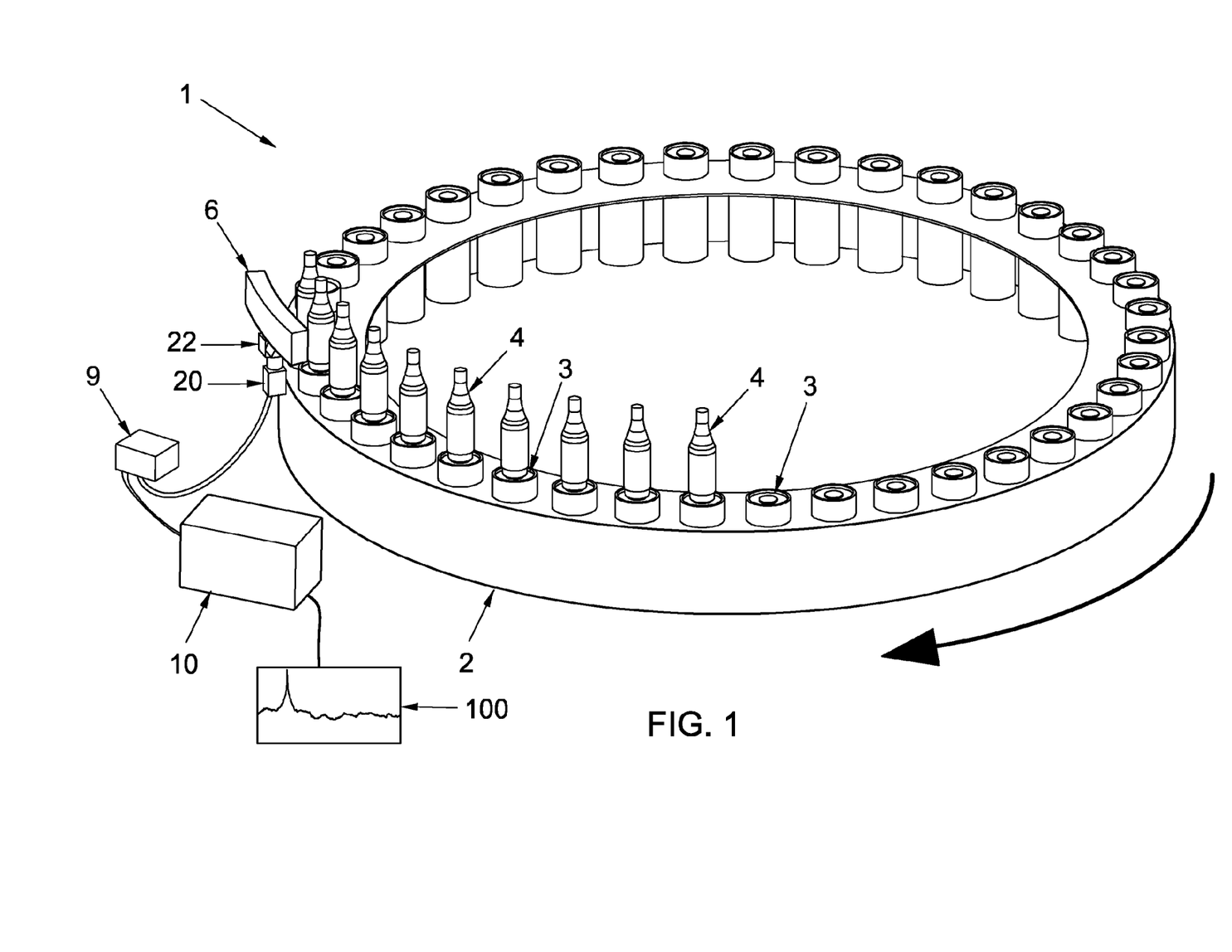
FIG. 1 is a schematic view of the orientation device according to the invention.

With particular reference to the above-described figures, as may be seen in FIG. 1, the device for the orientation of containers is denoted in its entirety by the number 1.

The device 1 is preferably used for the orientation of transparent or opaque glass or plastic containers 4, typically at least partly cylindrical and/or conical in shape, intended to be labelled. The device 1 comprises a rotating carousel 2 rotating about a vertical axis L1 thereof, as may be seen in FIG. 2, and having a circumferential plurality of seats 3, each supporting a corresponding container 4 oriented with the vertical axis L2, as may be seen in FIG. 2.

Figure 2:
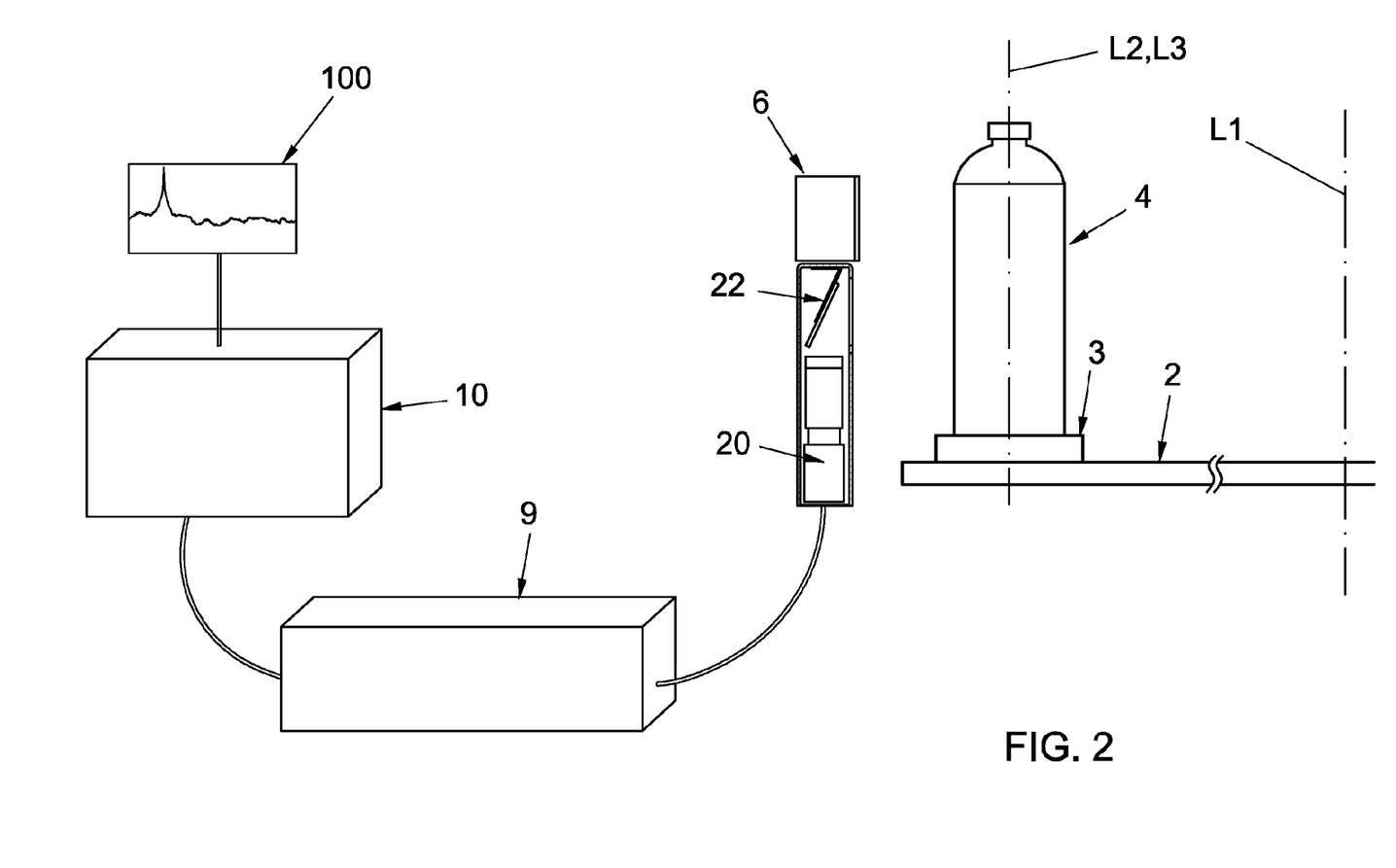
FIG. 2 is a schematic side elevation view of the optical reconstruction station.

Each seat 3 rotates about its own axis L3, likewise vertical and coinciding with L2 so, as a result of the combined actuation of the carousel 2 and the seat 3, a movement of rotation-revolution is imparted to the container 4, during which it maintains its axis with a vertical orientation.

Conveniently, the carousel 2 has an angular position that is rigidly connected, during its movement, with the angular position of each of the seats 3.

In a pre-established area of the carousel 2 there is provided an optical reconstruction station having an illuminator 6 of the individual container 4 and a recording device 20 for recording multiple sequential images of the individual container 4 during its motion of rotation-revolution.

In the solution illustrated, there is provided a single fixed illuminator 6 and a single fixed recording device 20, in particular a fixed frame camera.

The illuminator 6, positioned at the perimeter of the carousel 2, has a projection surface in front of which the containers 4 pass during the motion of rotation-revolution.

The containers 4 expose their entire lateral surface to the illuminator 6 during their passage in front of the latter.

As may be seen in FIG. 2, the optical principle used is that of the reflection of light on the outer surface of the container 4.

Essentially, the optical reconstruction station provides for the illuminator 6 and the recording device 20 to be positioned on the same side of the containers 4 which pass sequentially in front of them, and a mirror 22 which redirects the light reflected from the container 4 onto the recording device 20.

The illuminator 6 emits light from its emission surface facing towards the carousel 2, and the emitted light strikes an angular sector of the surface of the container 4, enabling the observation thereof.

The device further comprises a synchronization means 9 for synchronizing between the images recorded by the recording device 20 and the angular positions of the carousel 2 and those of the seats 3 of the containers 4, and an electronic control means for recording, processing and analyzing the images and the data.

As said, the present invention aims to orient the containers 4 that pass through the Ni positions of the optical reconstruction station.

It is necessary to distinguish three distinct steps of use of the invention.

Figure 4:
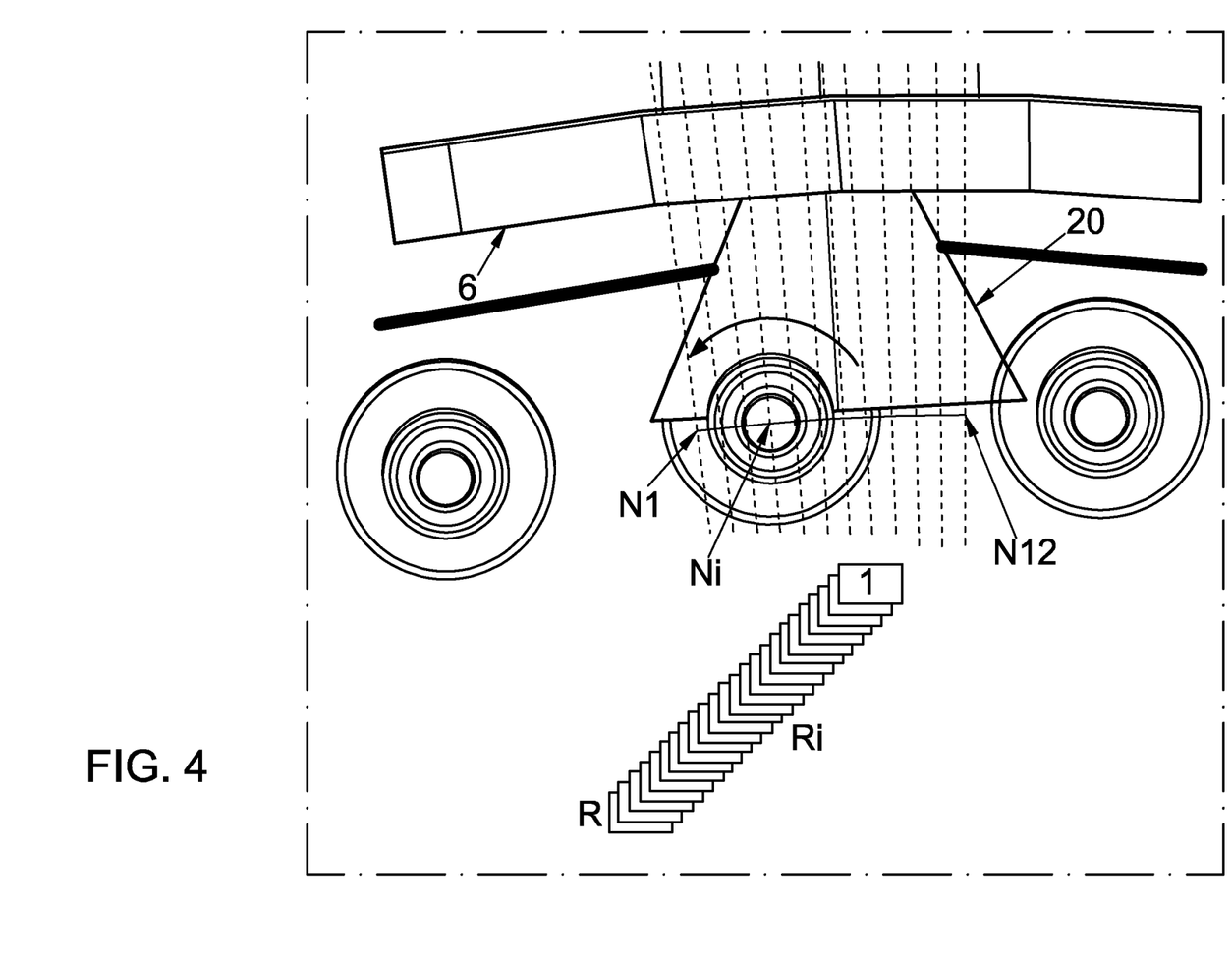
FIG. 4 illustrates the learning step.

1.—Learning: the invention "learns" a container 4.

In this step the carousel 2 is stationary (or in a non-operating position), and the container 4 is positioned successively in each of the N positions identified in the field of view of the recording device 20. In each of said Ni positions, the container is set into rotation by the seat 3 rotating about its axis L2 and Ri images are acquired over a complete revolution of the container 4 itself, one at every $\Delta\alpha=360°/R$ degrees.

Therefore, N×R images are learned.

2.—Validation: the various learning operations carried out in the preceding step are "phase synchronized"; in this manner the geometric and motion parameters are learned.

Figure 3:
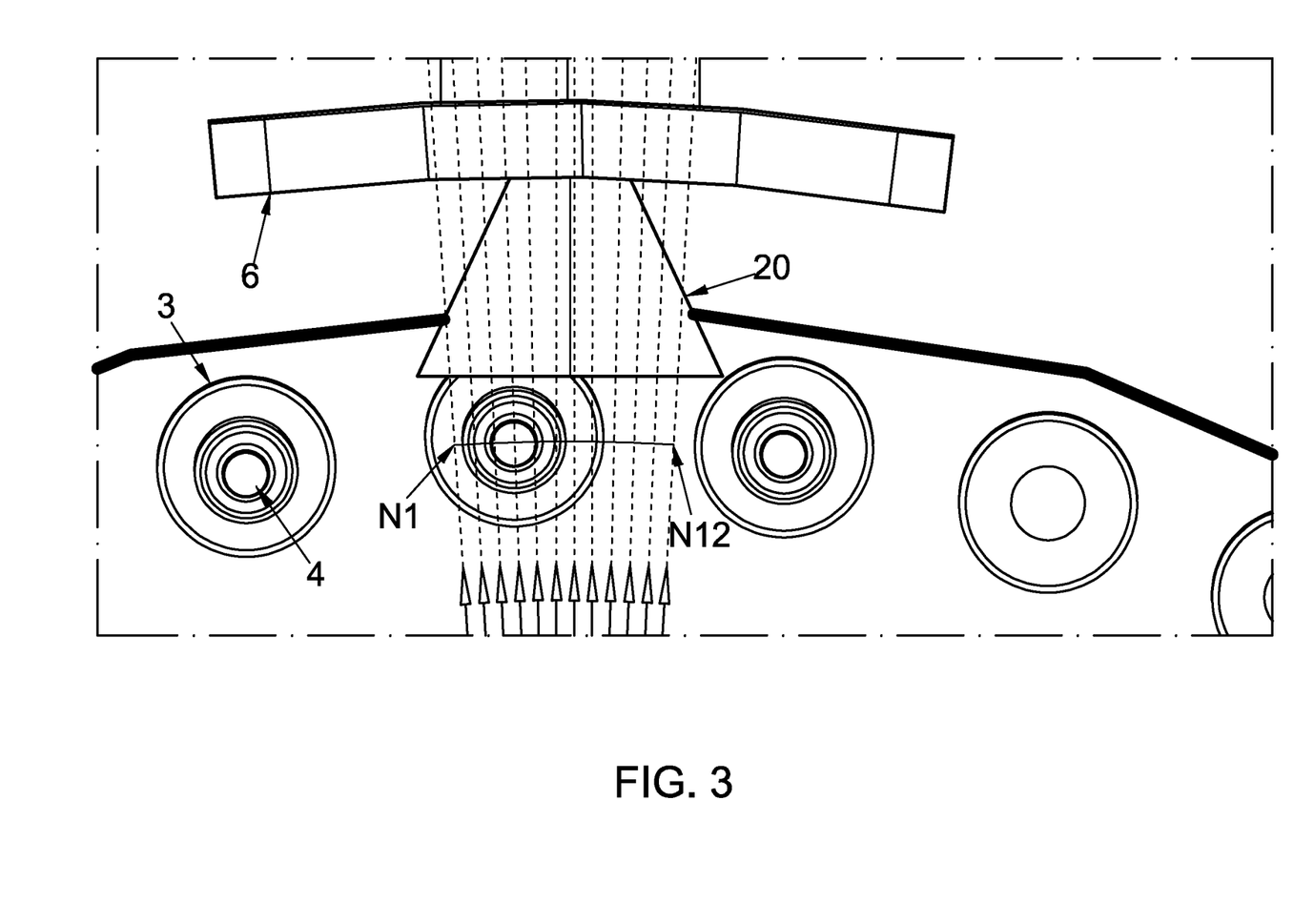
FIG. 3 schematically shows the number N of positions in which images of the container are detected.

The container 4 is made to pass in front of the orientation system with the carousel 2 in the operating mode: the container 4 rotates according to a precise law of motion while it passes across the field framed by the recording system 20 and N single images are acquired in the Ni pre-established positions.

By means of a specific algorithm, the N−1 offsets for re-synchronizing the similarity functions are calculated by the control system 10.

The process is automatic and requires no input from qualified personnel, only the starting of the carousel 2.

These first two steps, the learning step and the validation step, are carried out solely to create an "operating recipe" with a type of container 4 that was previously unknown.

Figure 6:
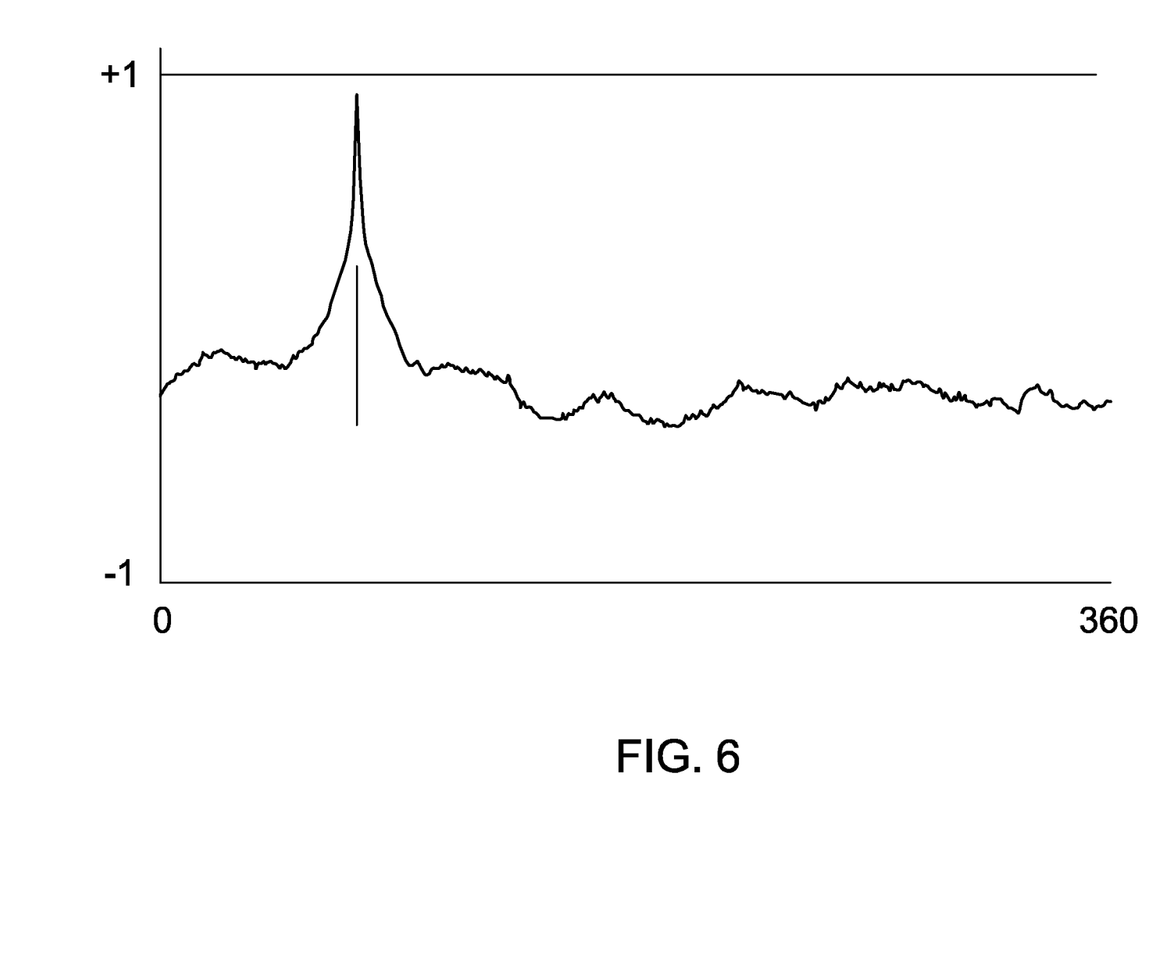
FIG. 6 shows a similarity graph.

Let f be the operator that returns a value of similarity between two images, let $s=f(r)$ then be a similarity function with $r\in\mathbb{N}$ where $1\leq r\leq R$, and $s\in R$, where $-1\leq s\leq 1$, the discrete function that represents, in graph form, the similarity between the image of a container 4 in a defined position Ni and the population of R images learned in that defined position.

The similarity function $s=f(r)$ thus takes on values between −1 and 1, where the two extreme values have the meaning of zero similarity and total coincidence, respectively.

The system computes N similarity functions for each container, one for every position Ni.

Let these be $s=f(r_i)$ with $\in\mathbb{N}$ where $1\leq i\leq N$.

Let $S(r)=\Sigma_{i=1}^{N} f(r_i)$ be the sum function of the N similarity functions. Since the similarity functions each express the similarity of what is seen now with what was learned previously, and in relation to an angular sector of the container 4, the sum function expresses the whole container.

However, this can be true only assuming that the individual similarity functions are "phase synchronized" i.e. "superposable", i.e. in the assumption that for every r the similarity functions express all of the similarities of the container rotated by the same amount, i.e. $\alpha=r\cdot\Delta\alpha$.

If this assumption is true, let $M=\max(S(r))$ be the maximum value taken on by the sum function of the N similarity functions.

This value is formed at a certain $r_m$.

Therefore, $M=S(r_m)$.

Thus $\alpha_m=r_m\cdot\Delta\alpha$ is the angle by which the container 4 is rotated, and that is the angle that is communicated to the system for moving the plates 3, which, by imposing a rotation of $-\alpha_m$ on the container, positions all of the containers according to the same angle.

As seen, at the basis of the orientation of the containers 4 there is the assumption that the similarity functions are "phase synchronized" in such a way that it makes sense to produce the sum thereof and that at the maximum value of the latter the resulting angle of the container 4 is read.

The process of "phase synchronizing" the similarity functions is called "validation".

"Validation" is the automatic process that implements the control and management system 10 at the end of the learning step, and which by observing and recording the passage of a number C of randomly oriented containers 4 carries out the phase synchronization necessary for the subsequent operating phase.

At the passage of each of these C containers 4, which move across the field of view of the recording device 20 exactly as when in the operating mode, N single images are acquired and the N similarity functions are calculated.

Let these similarity functions be $s_i=f(r_i)$ with $i\in\mathbb{N}$ and $1\leq i\leq N$ where N is the number of the positions $r\in\mathbb{N}$ and $1\leq r\leq R$ where R is the number of angular sample images over a revolution $s\in R$ and $1\leq s\leq 1$ where s is a similarity value The object of this validation process is to calculate N−1 angular offsets which allow the N similarity functions to be made summable, hence superposable.

What is meant by "offset" of a similarity function will now be explained.

Let $s_i=f(r_i)$ be the i-th similarity function relative to the i-th position.

The same function offset $k_i$ is:

$s_i=f(r_i-k_i)$ with $i\in\mathbb{N}$ and $1\leq i\leq N$ where N is the number of the positions $r\in\mathbb{N}$ and $1\leq r\leq R$ where R is the number of angular samples over a revolution $s\in R$ and $-1\leq s\leq 1$ where s is the similarity value $k\in\mathbb{N}$ and $1\leq k\leq R$ where R is the number of angular samples over a revolution which is equivalent to a "circular shift over the domain".

Let these offsets be indicated with k: the purpose of the validation is to calculate the offset vector $<k_1, k_2, k_3, \ldots k_{N-1}>$ which enables the similarity functions to be phase synchronized, and thus gives meaning to their sum.

A generic similarity function, if it refers to an angular part of the container 4 in which unique information is present, generally possesses a "peak".

Figure 7:
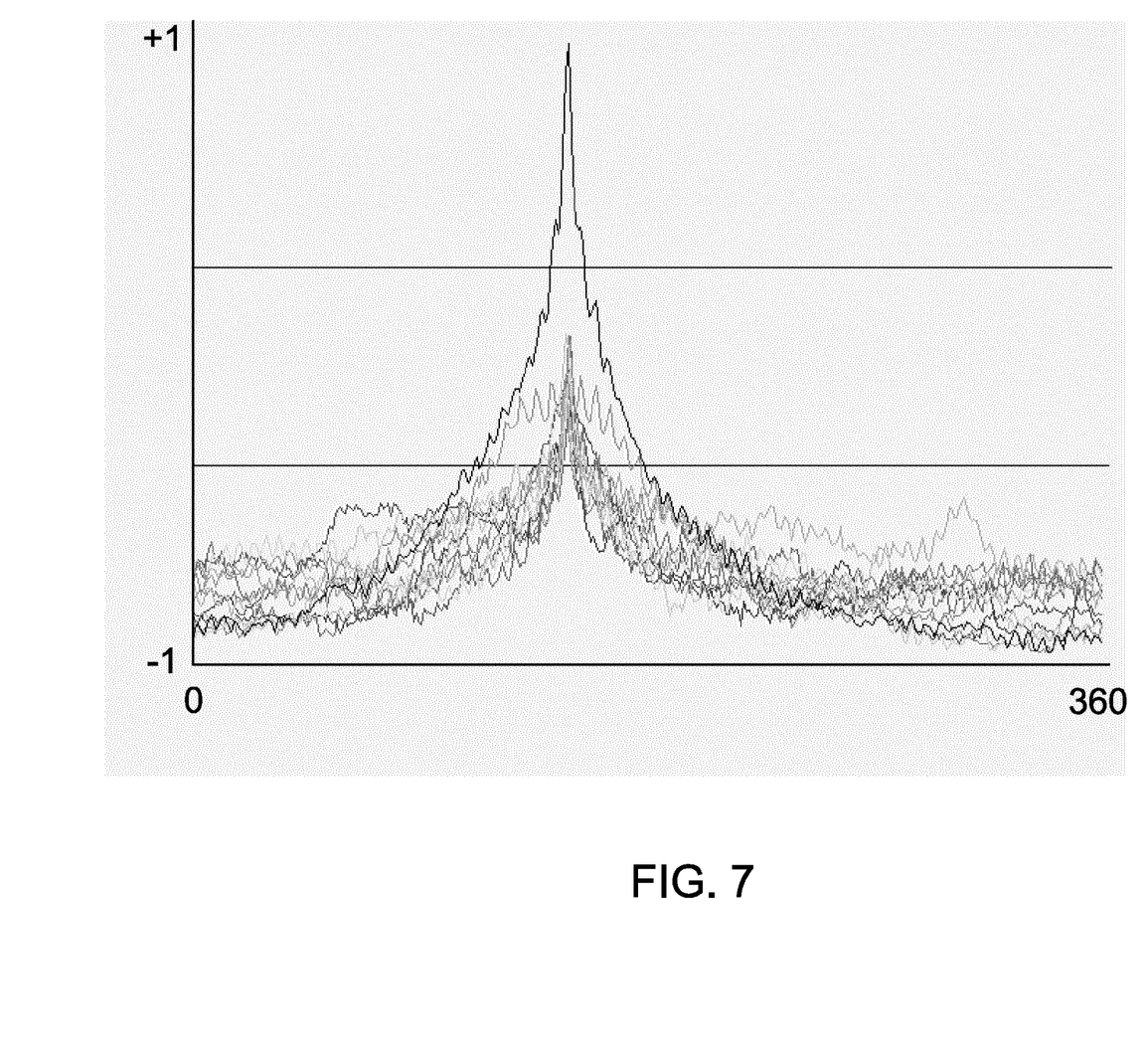
FIG. 7 graphically shows the phase synchronized peaks acquired in the various positions of the container.

If, for the sake of simplicity, we consider a container 4 completely covered by unique information, where all the similarity functions possess a peak, the phase synchronization of the functions means finding the series of offsets that leads all of the peaks to coincide in a same value of r for all of the functions.

The validation corresponds, in fact, to finding the N−1 offsets which, when applied to the similarity functions originating from a sufficiently large statistical sample of containers 4, maximize the sum of all the functions, of all the positions, for all the containers.

Formally, for a generic container cj there are N similarity functions $s_{ij}=f(r-k_i)$ with $i \in \mathbb{N}$ and $1 \leq i \leq N$ where N is the number of positions $r \in \mathbb{N}$ and $1 \leq r \leq R$ where R is the number of angular samples over a revolution $s \in \mathbb{R}$ and $-1 \leq s \leq 1$ where s is a similarity value $k \in \mathbb{N}$ and $1 \leq k \leq R$ where R is the number of angular samples over a revolution $j \in \mathbb{N}$ and $1 \leq j \leq C$ where C is the number of containers used Let $S(r)_{<k1, k2, k3, \ldots kN-1>} = \Sigma_{j=1} C (\Sigma_{i=1} N f(r_i-k_i))$ be the space of the sum functions of all the C×N similarity functions of all the C containers for all the N positions.

That is, given an offset vector $<k_1, k_2, k_3, \ldots k_{N-1}>$ one obtains a function $S(r)$ that is a single similarity function, the sum function of all the C×N similarity functions of all the C containers for all the N positions.

Therefore, this function will have a maximum value at a given r.

Let that maximum value be $M_{<k1, k2, k3, \ldots kN-1>} = \max(_{r=1}^{R} (S(r)_{<k1, k2, k3, \ldots kN-1>}))$ For every offset vector, therefore, there exists a maximum value M: the offset vector looked for is the one that produces the highest value of M.

An exhaustive execution of this calculation is simply impracticable, however. In the most common practical implementation with a number of containers C=30, a number of positions N=12, and a number of images R=resolution=360 images over a revolution, the general complexity of the calculation is the following:

$$\max(_{r=1}^{R} S(r)_{<k1,k2,k3, \ldots kN-1>}) = \max(_{r=1}^{R} (\Sigma_{i=1} C (\Sigma_{i=1} N f(r_i-k_i))))$$

It is a matter of performing $360^{11}$ calculations of the function $S(r)$, then extracting the maximum value for all 360 values of r of the domain: the typical complexity of this calculation is therefore in the order of $360^{12}$ iterations.

Therefore, an integral part of the present invention is a strategy for calculating the N−1 offsets that allows the complexity of the calculation itself to be reduced. This strategy is based on the partial sums of the positions.

A first reference position r1 is chosen, for which the similarity functions will thus not be offset, whereas a second reference position r2 is offset by all of the possible R values.

Let $S(r)_{<k1>} = \Sigma_{j=1} C (f(r_2-k_1)+f(r_1))$ be a population of $S(r)$, each for a different value of the offset $k_1$.

For each of these functions the value Max M is found, and the $k_1$ chosen corresponds to the maximum value M found, let it be $k_{1\_ok}$.

What has been done in this manner is to calculate the best offset $k_1$ which maximizes the maximum of the sum of the similarity functions of the first two positions r1 and r2. Progressively, and in the same manner, once the offset between the first two positions r1 and r2 has been blocked, one proceeds to sum the first three for all of the possible offsets k2 of the third position r3:

$S(r)_{<k2>} = \Sigma_{j=1} C (f(r_3-k_2)+f(r_2-k_{1\_ok})+f(r_1))$, and in the same manner one chooses the offset $k_{2\_ok}$ that makes the maximum value M of the function $S(r)$ reach the highest value.

Similarly, the process is repeated for all the successive positions:

$S(r)_{<k3>} = \Sigma_{j=1} C (f(r_4-k_3)+f(r_3-k_{2\_ok})+f(r_1))$, ... until the complete calculation of the offset vector:

$$<k_{1\_ok}, k_{2\_ok}, k_{3\_ok}, \ldots k_{(N-1)\_ok}>$$

In short, the "validation" process, i.e. the calculation of the N−1 angular offsets (expressed in sampling units r, which coincide with a degree in the case of sampling with 360 images, with half a degree in the case of 720 images, etc.), enables the system to know:

geometry of the container;

relative container—recording device—illuminator geometry;

position of the different points of recording of an image of the container;

initial angle of container learning in each recording point;

movement of rotation-revolution that the container completes within the field framed by the recording device during the operating phase;

At the end of this process, the system is ready for the operation of orienting the containers 4.

Figure 5:
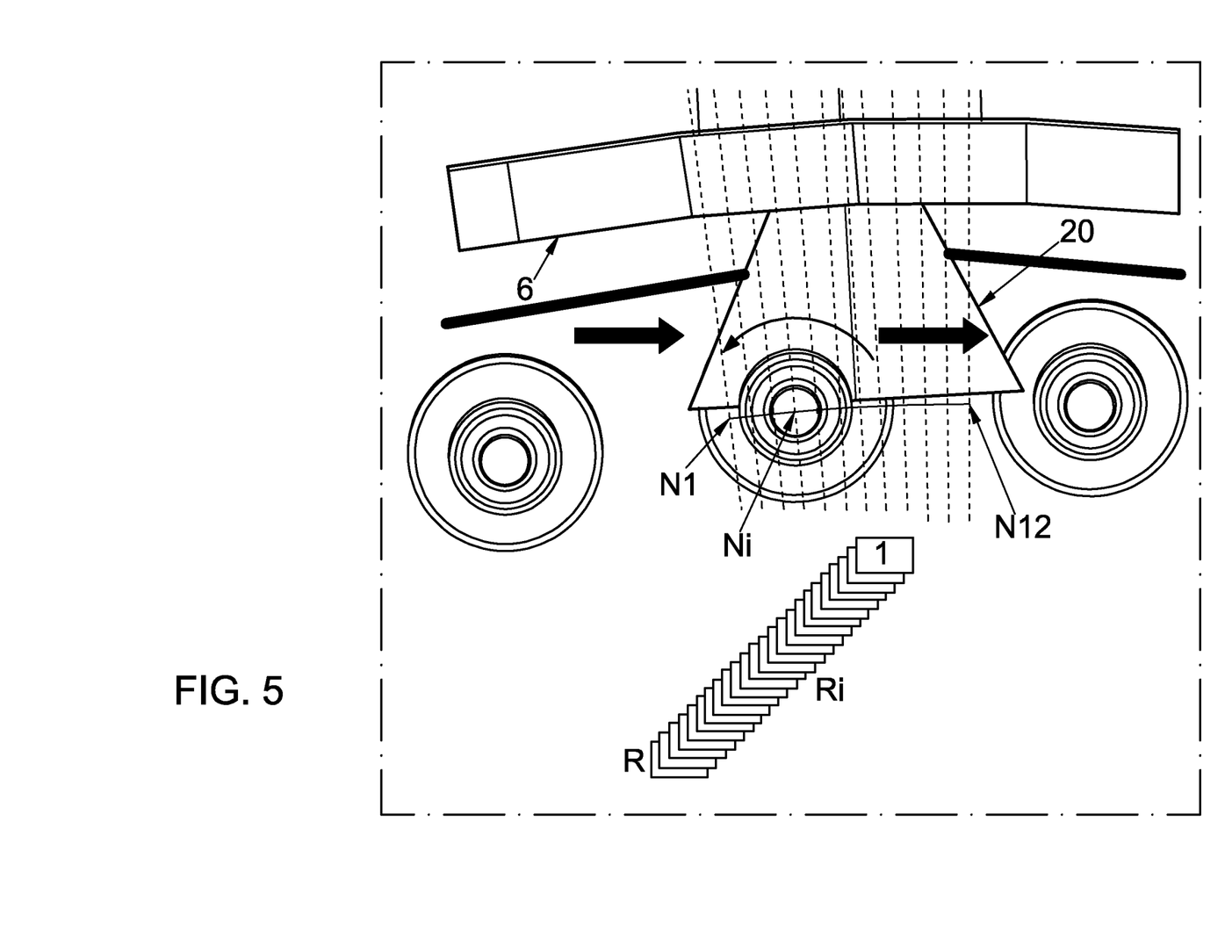
FIG. 5 shows the operating phase.

3.—Operation: with the carousel in the operating mode, every container 4 in transit, with a motion of rotation-revolution, and which arrives with a random angle in the field framed by the recording device 20, is photographed N times in the Ni established, known positions.

N graphs are drawn, representing the similarity between the current Ni photos and the Ni populations learned during the learning in each position. The functions are summed and the maximum peak is formed at a given angle $\alpha_m$.

This given angle $\alpha_m$ is the angle that is communicated by the management and control system 10 to the motorized system that controls the motor of the plate 3 under the container 4, the result being that the container 4 itself is rotated and oriented in the desired manner in order to perform further operations thereon such as labelling, marking, and others.

In concrete terms: in the operating phase, at the passage of a container 4 with a motion of rotation-revolution within the field framed by the recording device 20, the same container is photographed in N positions, which are the same where the learning process was carried out. Each of the N recorded photos originating from the Ni positions is compared with the R images learned in that same position of the Ni positions in the learning step, and a similarity function is drawn.

This function, if the image it is associated with contains the information useful for orienting the container, will contain a "peak".

All of the similarity functions associated with images containing unique information for the purposes of orientation contain a peak.

Such peaks have been previously phase synchronized with one another by the validation process. What occurs is the creation of a "sum" function of all the similarity functions.

This function, as some of the summed functions have a peak, and these being phase synchronized, will itself contain a peak at a specific value of r: let this be defined as $r_m$.

The orientation of the container is then performed by determining the rotation angle am to which the value of $r_m$ makes reference, i.e. $\alpha_m = r_m \cdot \Delta\alpha$.

During operation, the graphic pattern of this sum function is displayed by the electronic control and management system 10 to the machine operators on the screen 100 for each container 4. The human eye is able to perceive the succession of pointed, sharpened shapes that follow one another in succession on the screen much better than if they were expressed by numbers.

The shape of this function is able to communicate a great deal of information: for example, if the apex becomes rounded or the slopes less steep, there is a loss of system precision due to differences in the containers or in the positions in which they are photographed, if the points are split into two (or bifurcate), this communicates a difference in the present movement of rotation-revolution compared to the one learned.

The application of the concept of "peak of similarity" is meant to be an integral part of the present invention; it enables:

by means of the "validation" or "peak phase synchronization" process, all the geometry of the system and of the motion of the container 4 to be autonomously reconstructed without the entry of parameters;

by displaying the sum function of the similarity functions, the good performance of the system to be communicated also to non-expert persons at a more "emotional" and analogue level rather than a cognitive and numerical one, given the visual ability of human beings to perceive shapes at a high speed, but not numbers.

Modifications and variants, in addition to the ones already mentioned, are naturally possible, such as, for example, lines for moving containers along linear or complex paths rather than on a circular carousel.

In practical terms, it has been observed that a device 1 for the orientation of containers 4 according to the invention is particularly advantageous because of its low cost from both a structural and a management point of view, given its compact size and its having only one viewing point, because of its operating simplicity and use by personnel who are not particularly qualified, because of the emotional indication of the proper functioning of the orientation system and real-time performance, also at high machine speeds and frequencies of the containers to be oriented.

A device for the orientation of containers thus conceived is susceptible of numerous modifications and variants, all falling within the scope of the inventive concept; moreover, all of the details may be replaced by technically equivalent elements.

In practice, all of the materials used, as well as the dimensions, may be of any kind, according to needs and the state of the art.

The invention claimed is:

1. A device for the orientation of containers comprising:
a rotating carousel rotating about a carousel vertical axis thereof having a circumferential plurality of seats each of which rotates about a seat axis to impart to each container housed therein a rotation about a container vertical axis and jointly with said rotating carousel a movement of rotation-revolution,
a fixed illuminator of said container and a single fixed recording device recording multiple sequential images of said container during said movement of rotation-revolution, said recording device being in a position to acquire the light reflected from said container illuminated by said illuminator,
an electronic controller comprising a learning device, a validation device and an operating device, the learning, validation, and operating devices operating together in a temporal sequence, said learning device being adapted to carry out a step of learning the entire lateral surface of one said container in a number N of positions within the field framed by said recording device, in which, when said carousel is stationary, for each learning in each of the N positions said container is positioned with a random initial orientation, and during a rotation of 360° about the container axis a number R of images of said container being acquired, said validation device being adapted to carry out a validation step in which said electronic controller acquires from said recording device only one current image of said container in each position N, said electronic controller processing a similarity function representing the similarity between each current image Ni and the R images recorded in the same position N in said learning step, phase synchronizing and summing said similarity functions;
an operating means active during the rotation of said rotating carousel, in which for each of said containers said electronic controller acquires from said recording device only one current image in each position N, processes a similarity function representing the similarity between each current image Ni and the R images recorded in the same position N in said learning step, calculates and sums the similarity functions and the angle $\alpha_m$ corresponding to the maximum value of this sum is used for the orientation of said container.

2. The device for the orientation of containers according to claim 1, wherein said angle $\alpha_m$ is communicated by said electronic controller to a motor system moving the plates of said rotating carousel, which, by imposing on said container a rotation of $-\alpha_m$, positions all of said containers according to the same angle.

3. The device for the orientation of containers according to claim 1, wherein said recording device uses cameras with sensors of the CMOS type adapted to allow a mechanism of recording sequential images with "successive crops" of the sensor, the sensor crop being set to pick up only the portion of pixels where said container is located at each time during its advancement.

4. The device for the orientation of containers according to claim 1, wherein said validation step is an automatic procedure, said electronic controller inferring all the information automatically on the basis of a statistical observation of a statistically necessary number of said containers in transit in the field framed by said recording device.

5. The device for the orientation of containers according to claim 1, wherein said validation step consists in the resolution of algorithms which allow obtaining a measure of image similarity between an image recorded by said recording device in a given position N during the passage of said container and all the R images forming part of the population learned during said learning step in that same given position N.

6. The device for the orientation of containers according to claim 1, wherein said validation algorithms are based on partial sums of the similarity functions of successive positions N.

7. The device for the orientation of containers according to claim 1, wherein said validation step produces, by said electronic controller, a drawing of a graph containing the similarity measure of an image recorded by said recording device in a given position N during the passage of said container during the operating phase with all the R images recorded by said recording device and saved by said electronic controller in said learning step with said carousel stationary in the same position N with said container in rotation about the container axis.

8. The device for the orientation of containers according to claim 7, wherein said graph contains an indication of the "peak", said "peak" being the visual expression that allows an understanding of which image of the learned population is most similar to the current one, if there are other similar images in the population and in what proportion with respect to the main one, its "sharpening" determining the precision of the system, i.e. the similarity difference between the most similar image among the learned ones and the images in the adjacent degrees of rotation.

9. The device for the orientation of containers according to claim 7, wherein said graph is displayed by the electronic controller a screen for each container.

* * * * *